US008950806B2

(12) United States Patent
Smith

(10) Patent No.: US 8,950,806 B2
(45) Date of Patent: Feb. 10, 2015

(54) EASILY REMOVABLE, REUSABLE SEAT CUSHION

(71) Applicant: Eric L. Smith, Sarver, PA (US)

(72) Inventor: Eric L. Smith, Sarver, PA (US)

( * ) Notice: Subject to any disclaimer, the term of this patent is extended or adjusted under 35 U.S.C. 154(b) by 32 days.

(21) Appl. No.: 13/854,876

(22) Filed: Apr. 1, 2013

(65) Prior Publication Data

US 2013/0257112 A1 Oct. 3, 2013

Related U.S. Application Data

(60) Provisional application No. 61/618,769, filed on Mar. 31, 2012.

(51) Int. Cl.
| | | |
|---|---|---|
| *B60N 2/40* | (2006.01) | |
| *B62J 1/00* | (2006.01) | |
| *B62J 1/20* | (2006.01) | |
| *A47C 27/08* | (2006.01) | |
| *A47C 7/02* | (2006.01) | |
| *B62J 1/14* | (2006.01) | |

(52) U.S. Cl.
CPC ............. *B62J 1/20* (2013.01); *A47C 27/085* (2013.01); *A47C 7/021* (2013.01); *B62J 1/14* (2013.01)
USPC ............ 297/195.13; 297/219.1; 297/219.11; 297/256.16

(58) Field of Classification Search
CPC ............ B62J 1/14; A47C 7/021; A47C 7/18; A61G 2005/1045; A61G 5/1043; Y10S 297/06
USPC ................. 297/195.13, 219.1, 219.11, 215.1, 297/215.11, 256.16

See application file for complete search history.

(56) References Cited

U.S. PATENT DOCUMENTS

| | | | | |
|---|---|---|---|---|
| 4,779,924 A | * | 10/1988 | Rudel | 297/195.13 |
| 5,088,747 A | * | 2/1992 | Morrison et al. | 297/219.1 |
| 5,533,783 A | * | 7/1996 | Harms et al. | 297/195.13 |
| 5,678,266 A | * | 10/1997 | Petringa et al. | 297/219.1 X |
| 6,009,578 A | * | 1/2000 | Davis | 297/219.1 X |
| 6,481,792 B1 | * | 11/2002 | Goin | 297/195.13 |
| 6,648,408 B1 | * | 11/2003 | Grove | 297/195.13 |
| 6,893,087 B2 | * | 5/2005 | Hancock et al. | 297/219.11 |
| 6,901,617 B2 | * | 6/2005 | Sprouse et al. | 297/219.1 X |
| 7,275,787 B1 | * | 10/2007 | Grove | 297/195.13 X |
| 7,290,632 B2 | * | 11/2007 | Hanagan | 297/195.13 X |
| 7,556,114 B2 | * | 7/2009 | Hanagan | 297/195.13 X |
| 7,571,921 B1 | * | 8/2009 | Hoeve | 297/195.13 X |
| 7,757,321 B2 | * | 7/2010 | Calvert | 297/219.1 X |
| 8,262,160 B2 | * | 9/2012 | Mafi et al. | 297/219.1 |
| 2006/0290178 A1 | * | 12/2006 | Desser | 297/219.11 X |
| 2009/0295203 A1 | * | 12/2009 | Lewis et al. | 297/219.1 |
| 2011/0198898 A1 | * | 8/2011 | Galati | 297/195.13 |
| 2012/0086248 A1 | * | 4/2012 | Morabito | 297/219.11 |
| 2014/0125098 A1 | * | 5/2014 | Vainberg et al. | 297/219.1 |

* cited by examiner

*Primary Examiner* — Rodney B White
(74) *Attorney, Agent, or Firm* — Gary P. Topolosky

(57) ABSTRACT

A flexible cushion for removably attaching to a non-planar surface for use by a human seat, hand, arm or knee. The cushion comprises a housing having a top and bottom surface, a flexible gel layer in said housing and a flexible adhesive layer permanently applied to the bottom housing surface. Preferred embodiments use this cushion for the main motorcycle rider or a fender-riding passenger. It also serves as an excellent portable cushion for stadium seats and bleachers.

19 Claims, 8 Drawing Sheets

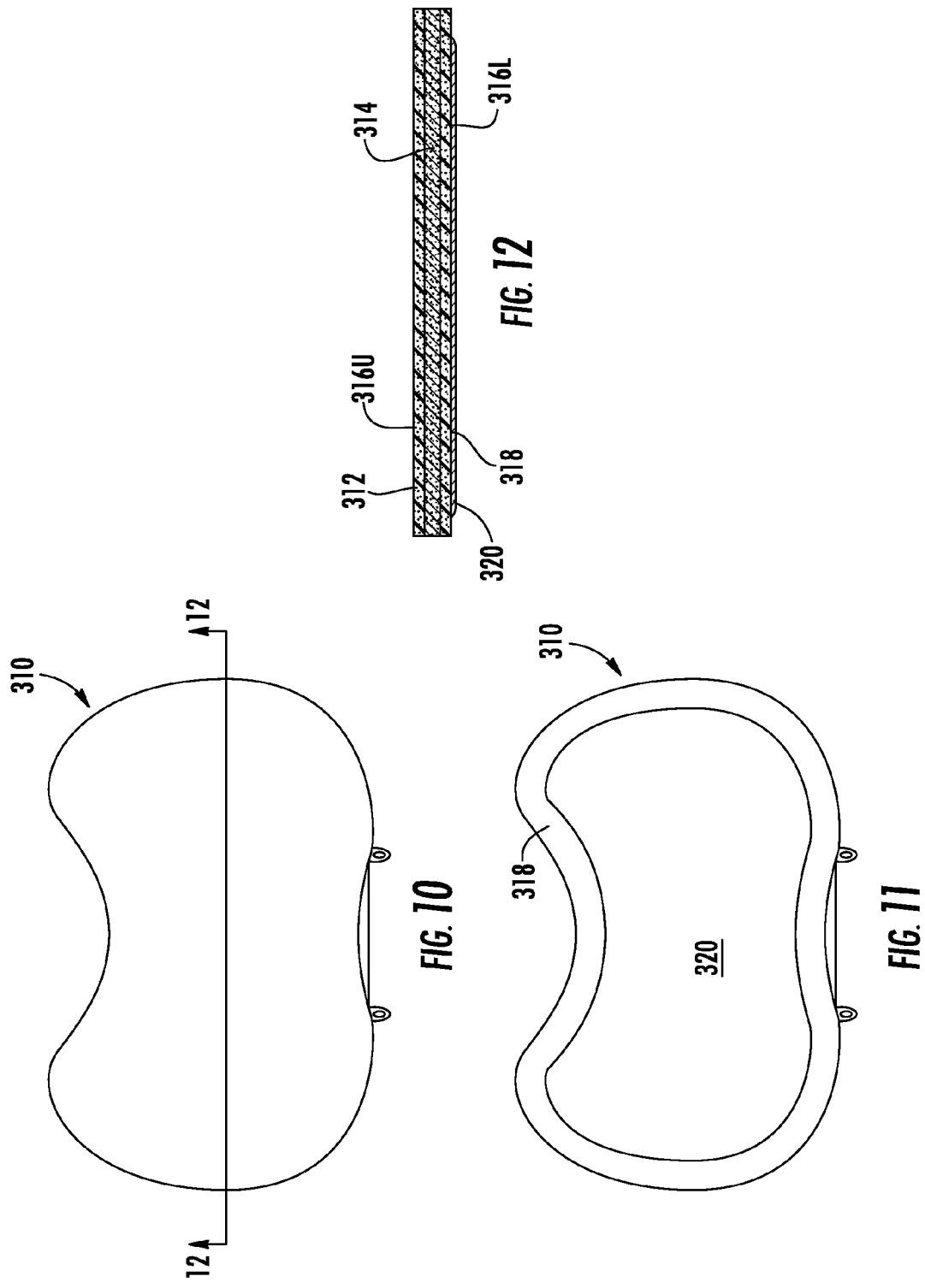

US 8,950,806 B2

EASILY REMOVABLE, REUSABLE SEAT CUSHION

RELATED APPLICATION(S)

This application is a perfection of U.S. Provisional Application No. 61/618,769, filed on Mar. 31, 2012, the disclosure of which is fully incorporated by reference herein.

BACKGROUND OF THE INVENTION

1. Field of the Invention

This invention relates to auxiliary seats and cushions. They have applications for the rear fender of a motorcycle and various other seating arrangements including: riding equipment (snowmobiles, mowers, tractors, etc.), home, business or office seating (bar stools, folding chairs, lawn chairs, picnic benches and the like), also for use at sporting events, i.e. stadium and/or bleacher seat cushions. There are also several non-seat comfort applications that alternate embodiments may address like hand and arm rests for hunters and sport shooters, exercise and/or yoga pads, kneeling pads for plumbers and gardeners and possibly even boxing practice targets. Still other variations may incorporate heater or cooler elements and/or vibrational/massage devices into said cushions. Ideally, it is envisioned to make and sell such products under the proposed mark BADASS PADS™ and through the badasspads.com website.

The present invention adheres to the underlying support surface like the motorcycle fender, bar stool, folding chair, bench seat or stadium seat without damaging or making marks on the same during or after use. With its temporary adhesion layer affixed to the cushion bottom, this invention may be slowly pulled up for disconnection from its underlying support. Preferably, an adhesion protector is applied to prevent that layer from unduly soiling after which the protector may be pulled away for re-use (i.e. refastening) to another surface for "temporary" use.

2. Description of Relevant Art

Several auxiliary seats for motorcycles have already been patented. See, for example, Regard U.S. Pat. No. 1,662,718, Svehla et al. U.S. Pat. No. 3,712,670 and LeBoeuf U.S. Pat. No. 2,109,571. Then there is Desser et al. U.S. Pat. No. 5,322,345. The latter employs a rigid base through which a plurality of suction cups pass for temporarily adhering to a motorcycle fender. When used for even a brief amount of time, such suction cups have been known to leave serious marks on the fender like dimples and scratches which may require costly, custom paint jobs to "fix".

None of the above inventions and patents, taken singly or in combination, describes the instant invention as claimed.

SUMMARY OF THE INVENTION

As motorcycle use grows more popular, more individuals are buying and riding them for leisure and/or for daily commuting. Unfortunately, there is only one seat incorporated into the motorcycle at manufacture for the individual-driver. The present invention provides an additional seat for any motorcycle having a rear fender in such a manner that it is easy to use, appealing to the eye, comfortable to the individual riding thereon and not disruptive of the paintwork and/or appliques affixed to said fender.

Accordingly, it is a principal object of the invention to provide a comfortable, removable, fender seat for a second rider on a motorcycle. This "temporary" seat easily attaches to the bike's rear fender with a cushiony adhesive layer that makes no permanent damage or markings and leaves little to no residue (film) on that fender after the seat has been removed.

It is another object of the invention to safely but still removably secure cushions (differing only by relative thickness or size) to the seat of a sporting venue, i.e. a ballpark, fold down stadium seat and/or permanent-temporary indoor bleacher (made of wood, metal or composite). The present invention has a protective cover over its lowermost adhesive layer, preferably made from one or more elastomer polymers that remain flexible in a wide range of temperature usages.

It is a further object to construct the seat cushion of this invention in such a manner that it is lightweight and uncomplicated in construction. A single individual, from age 5, through teenage, to senior citizen should be able to easily install and then subsequently remove this cushion from its desired venue.

Still another object is to create a removable seat whose outward appearance does not inadvertently affect the aesthetic appearance of a motorcycle fender onto which it has been installed.

There are also the aforementioned alternate applications, both seat and non-seat along with the incorporation of extra features like heaters/coolers and massagers.

It is another object of the invention to provide improved elements and arrangements thereof in an apparatus for the purposes described which is inexpensive, dependable and fully effective in accomplishing its intended purposes.

BRIEF DESCRIPTION OF DRAWINGS

Further features, objects and advantages of this invention will become clearer after reviewing the detailed description made with reference to the accompanying drawings and photographs in which:

FIG. 10 is a top plan view of a fourth embodiment, stadium seat variation of the present invention;

FIG. 11 is a bottom plan view of the stadium seat version from FIG. 10; and

FIG. 12 is a sectional view taken along lines 12-12 of FIG. 11.

DESCRIPTION OF PREFERRED EMBODIMENTS

Figure 1:
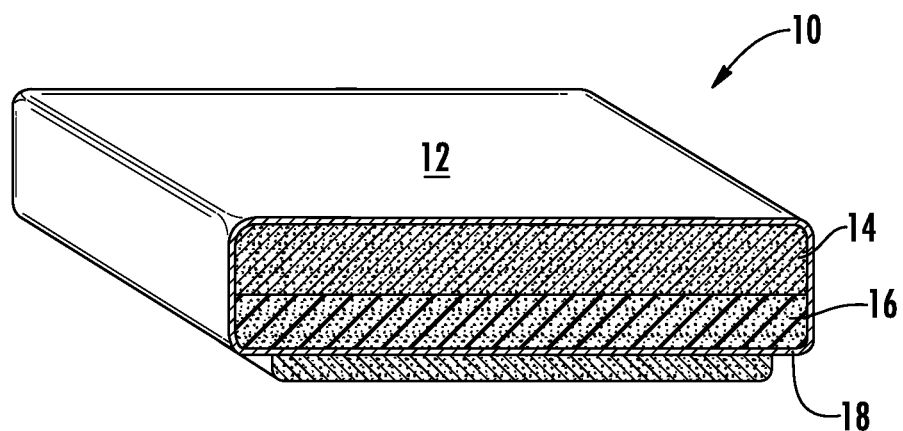
FIG. 1 is a top perspective view of one embodiment of thick cycle fender seat cushion shown in cross-section to reveal its various layers.
Figure 2:
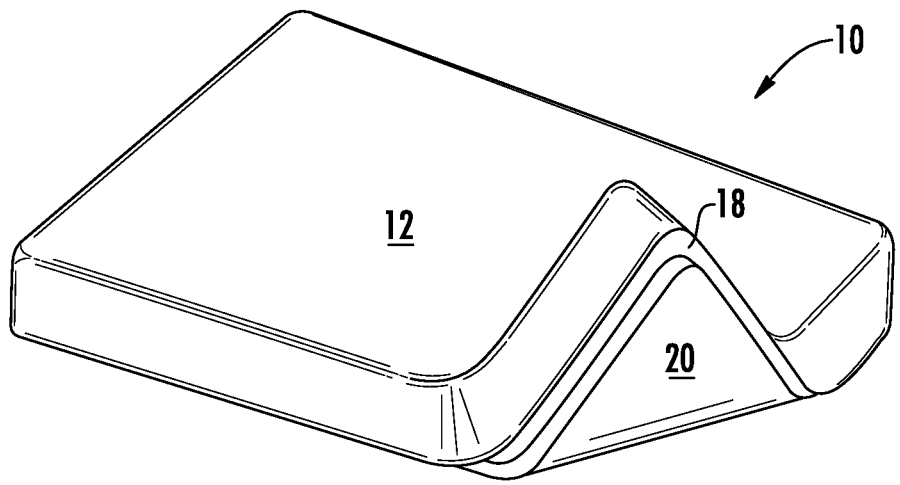
FIG. 2 is a top perspective view of the seat cushion from FIG. 1 as it would appear when being lifted from the right front corner for removing same from the hard underlying surface to which it would be temporarily affixed.

Common features in the different views of this invention are shown with the same reference numeral(s). For alternate embodiments of the same component, there is consistent numbering though in the next hundred series. When referring to any numerical ranges herein, it should be noted that all numbers within the range, including every fraction or decimal between its stated minimum and maximum, are considered to be designated and disclosed by this description. As such, disclosing a preferred cushion thickness ranging from 1 to 3 inches, expressly covers cushion sizes of 1.1, 1.25 and 1.5 inches . . . and so on, up to about 2.75, 2.8 and 2.99 inches. The same applies for every other quantitative range herein.

A primary objective of the first embodiment of this invention provides means for transporting an additional passenger on a second seat that removably attaches to the rear fender of a motorcycle. As seen in accompanying FIGS. 1 through 4, a generally polygonal, preferably rectangular-shaped, cushion 10 comprises an outer protective housing 12 in which is encased a thick gel component 14 and intermediate, memory foam layer 16.

Though not limited to any one size, shape or thickness, a representative motorcycle pad according to this first embodiment measures about 11 inches wide and about 9½ inches long with a total thickness of about 1⅛ inches for all the foregoing layers.

To the bottom exterior 18 of outer housing 12, there is applied (as described in more detail herein) a relatively thin layer 20 of sticky gel adhesive. Preferably that gel adhesive is poured into mold situated on the bottom of an outer housing and allowed to secure thereto. Once sufficiently treated and allowed to set (by time and/or temperature), that gel remains affixed to the cushion's underside 18 while still allowing for its repeated, albeit "temporary" attachment to a motorcycle fender, stadium seat and/or other underlying structure.

Figure 3:
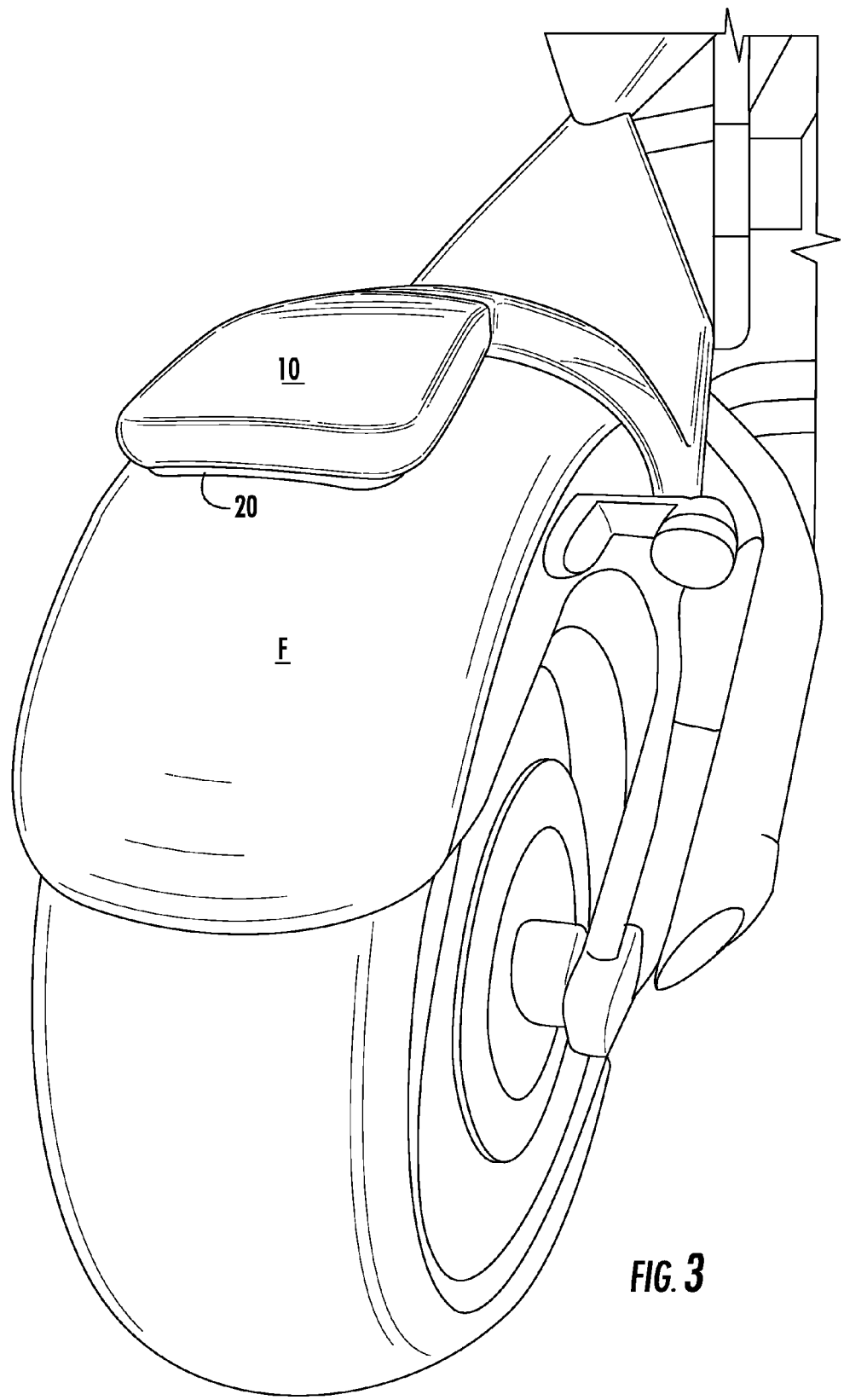
FIG. 3 is a top perspective view of the rear fender of a motorcycle with the full seat cushion from FIG. 1 affixed thereto.
Figure 4:
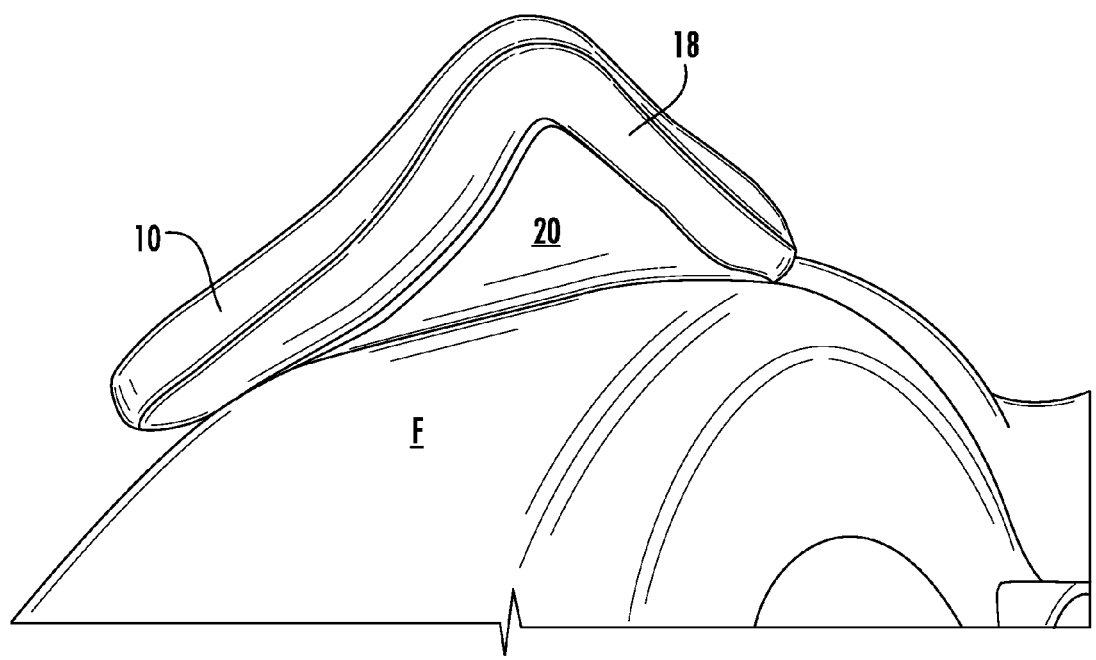
FIG. 4 is front perspective view of the seat cushion from FIG. 3 being lifted from the cycle's rear fender.

The removable seat cushion 10 in FIGS. 3 and 4 is meant to fit on the rear fender F of a motorcycle, behind the main seating area of the bike's rider. In many cases, that rear fender F may be custom painted to reflect the bike owner's personality, likes and/or allegiances.

Unlike the prior art, suction cup system of Desser et al, this invention need not require a stiffened underside through which cup connectors will have to pass. Nor is there an obligation for this invention to provide a pre-formed arcuate shape to better resemble the contours of a typical rear bike fender. That is because the overall configuration of this invention is significantly more flexible, i.e. bendable from side-to-side, than its Desser et al, suction-cupped counterpart.

This invention represents a significant improvement over other known bike fender cushions/pads since it does NOT disturb the costly paint jobs on such rear bike fenders. It adheres to same for as long as needed (for the extra bike rider to use) but then removes quite easily without unduly marking the fender with suction cups or scratches. It can also be left on a bike fender indefinitely, if desired.

Most embodiments of cushion, preferably seat cushion (though hand/arm rests and kneelers are also considered in the alternative), according to this invention are constructed of a moldable gel, or gel-like composition for lightweight yet suitable user comfort. In this first embodiment, the cushion 10 has a substantially rectangular block construction with a top surface onto which the spare rider's rear will rest when in use. Extending downward from that top surface are four sidewalls. As shown, the sidewalls are in pairs of parallel sides, ending substantially perpendicular to the top surface.

For unexpected yet rapid deployment, a second embodiment of this invention consists of a so-called Sneak pad cushion 110 carried on the bike owner's person or in a purse or other satchel. Though thinner that the fuller version of FIGS. 1-4, this much thinner, sleaker mini-cushion is shown in accompanying FIGS. 5 and 6. The main body of this Sneak pad should still be of sufficient thickness to provide some rump cushioning to the unexpected/unanticipated rider/passenger. It measures about 9 inches wide, about 7 inches long and no more than about ¼ inch thick.

Figure 5:
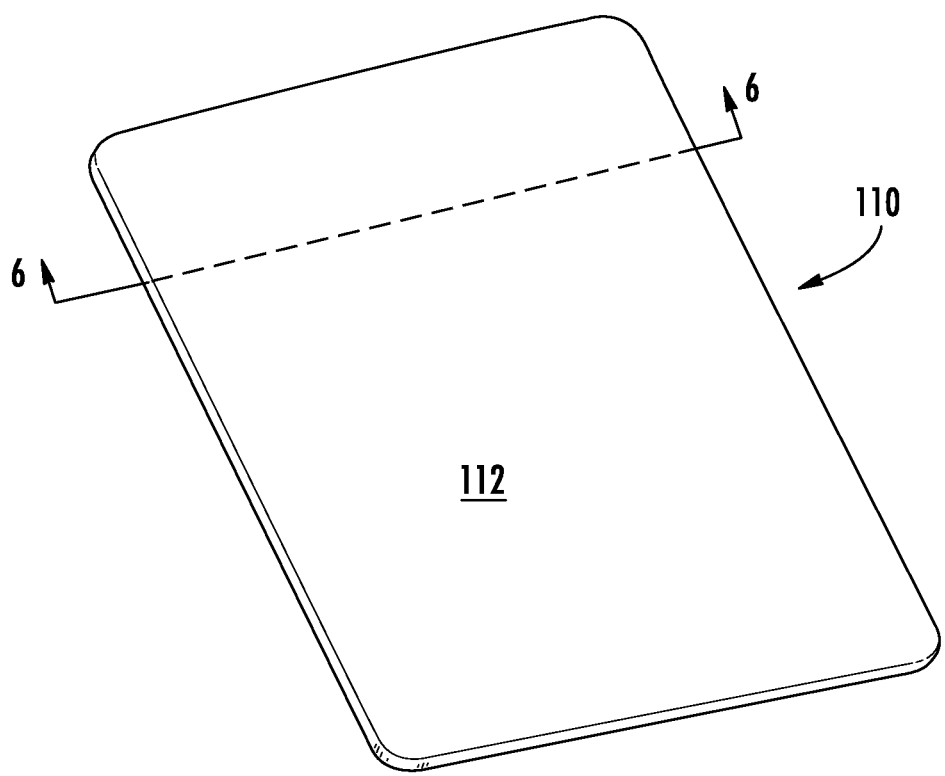
FIG. 5 is a top plan view of the thinner "Sneak pad" variation of removable cycle cushion according to a second embodiment of this invention.
Figure 6:
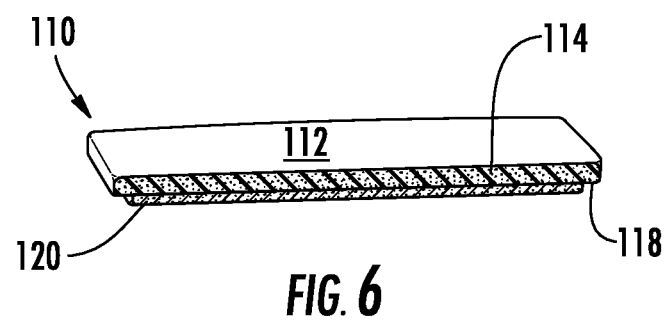
FIG. 6 is a perspective, sectional view taken along lines 6-6 of FIG. 5.

As shown in FIGS. 5 and 6, this second version of curvable cushion 110 comprises an outer housing 112 that encases a gel component 114. Because of its thinner "construction", no intermediate foam layer has to be added thereto. To its immediate underside layer 118, there is once more included a thin layer of reusable, washable adhesive 120. Because of its much smaller size (and thickness), the Sneak pad version can be readily stored, even on the motorcycle proper, when not in use. It can be removed from storage, then properly positioned for use by that unexpected, unanticipated rider/passenger.

Figure 7:
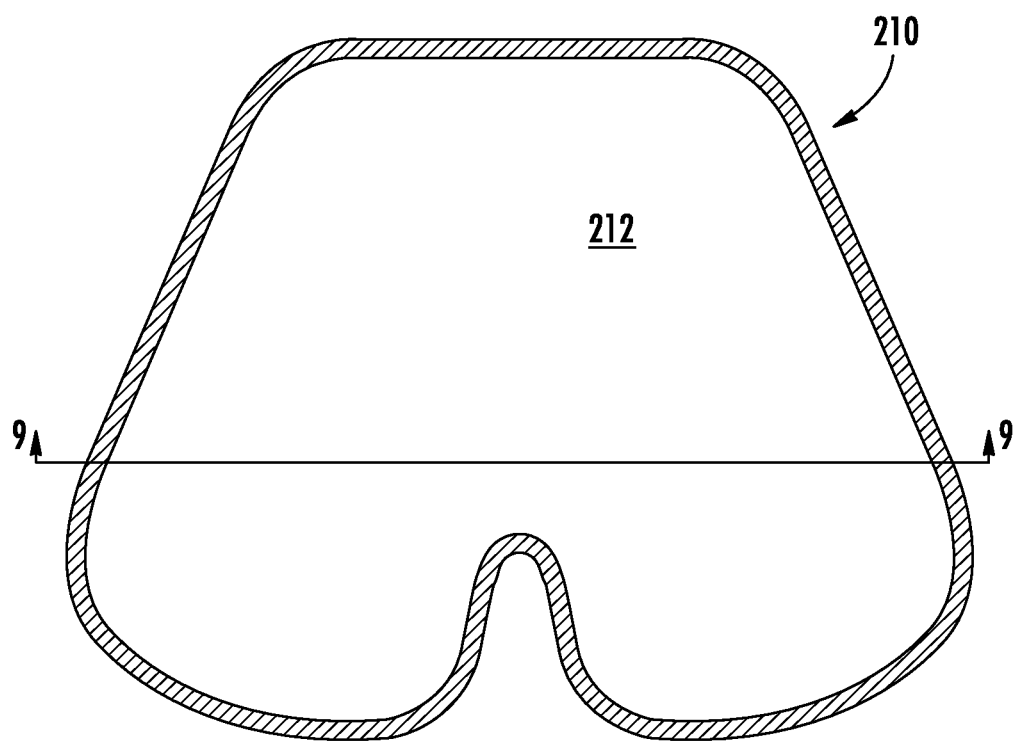
FIG. 7 is a top plan view of a third embodiment for use as a motorcycle "overseat" for greater comfort by the primary bike rider on long trips.
Figure 8:
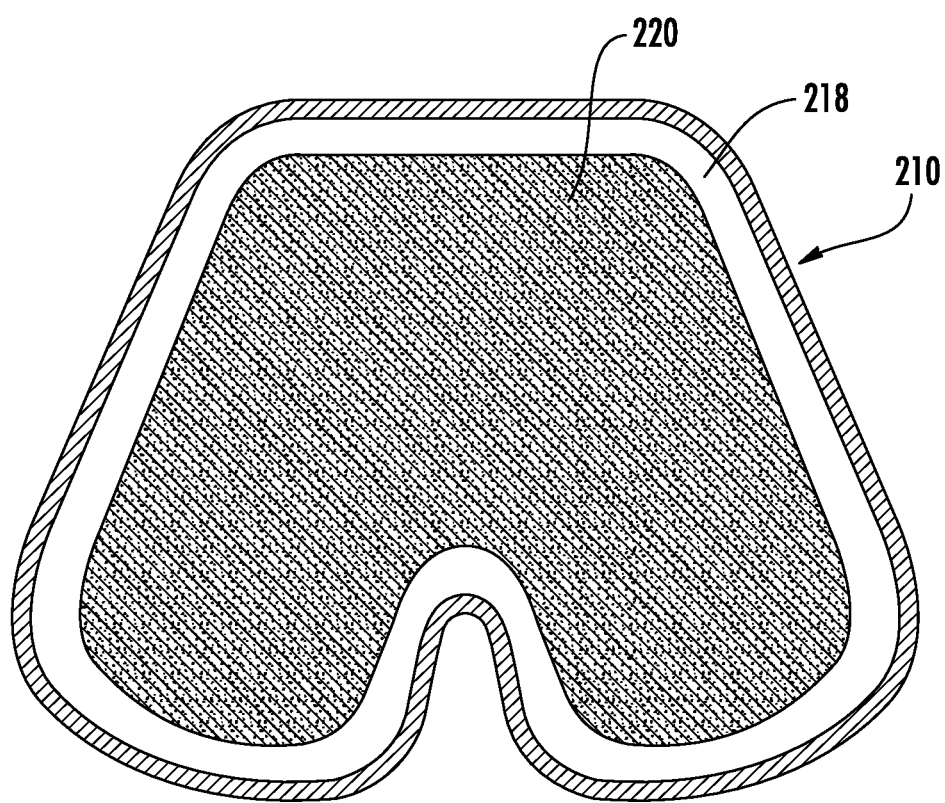
FIG. 8 is a bottom plan view of the overseat version from FIG. 7.
Figure 9:
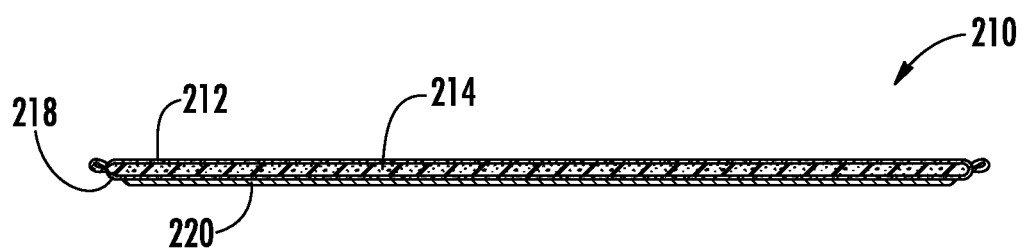
FIG. 9 is a sectional view taken along lines 9-9 of FIG. 7.

For longer excursions and highway rides, this same invention can be applied to the main cycle seat as a supplemental pad or "overseat". Once applied, the rider may better enjoy the open road in comfort. One version for such an overseat cushion 210 is shown in accompanying FIGS. 7 through 9. As it sits on an existing ride seat, it need not be as thick as the fender cushion variety of FIGS. 1 through 4. It need only require an adhesive layer 220 to its underside 218. Nevertheless, this variation of flexible cushion should more closely resemble the general perimeter size and shape for many main riding seats for motorcycles. One representative variety is the somewhat trapezoidal configuration with a cut in at the middle of the long bottom edge for better fitting on, and about the tank contours of many bike model seat shapes.

Still other shapes and sizes may be made for seat, hand or armrests and/or knee cushions per the present invention. For instance, the overall profile may be curved (i.e., even kidney shaped) and/or its sidewalls sloped, rounded or otherwise beveled. And the top surface can be made in other that a parallelgram, preferably a rectangle. In fact, that top surface may be fitted with rear end-hugging recesses or contours depending on the overall thickness of said cushion layer.

In yet another variation, the cushion of this invention can serve as temporary, albeit backless, support in a sports setting such as a ballpark, stadium, arena or auditorium. Ideally, the outer skin to such a model can be removed and stored away for eventual repositioning over the gel layer at game's end. Thereafter, the exposed sticky bottom can be situated and affixed onto the long continuous benches of an arena bleacher regardless of whether that bleacher is made from wood, metal or composites.

An affixed seat cushion, even if it is only a temporary affixing, is much less likely to be jostled or shifted and then lost between the rows of a bleacher. In a sports venue with automatically retracting seat bottoms, the cushion of this invention will remain attached to that bottom, regardless of the number of times its user has to stand for letting others pass by. Only after the user is ready to leave can this cushion be easily "pried" up and the adhesive protective cover installed over for its next use.

FIGS. 10 through 12 show this other embodiment of stadium seat cushion 310. As shown, it is generally kidney-shaped for better fitting the seat contours of its user. That cushion 310 includes an outer housing 312 (to which may be added team logos or sponsorship indicia as part of promotional giveaways) with a thick gel component 314 sandwiched by two memory foam layers, an upper layer 316U and lower layer 316L. The bottom exterior 318 of outer housing 312 includes its own thin adhesive layer 320. In addition, for easier transport to and from sports stadiums, this cushion includes a pair of loops 322 at one end to which a shoulder strap may be permanently or temporarily attached. Alternately, the stadium version may include an integral carrying handle (not shown).

Elastomer Flexible Adhesive Gel Layer

As mentioned above, a sticky gel layer permanently secures to the outer underside of the housing to these various cushion embodiments. One preferred embodiment is an elastomer polymer blended to retain its "temporary" adhesive properties at both low temperature and high temperature conditions. Furthermore, this polymeric blend can withstand typical weather exposures for prolonged periods. But, it is preferred that the cushion NOT be left on a bike fender for an extended term, unsupervised, as it may be subject to theft. For these reasons, it is recommended that the cushion be easily lifted, removed from the fender and stored in a locking fashion or necessarily carried on one's person.

A particular preferred adhesive composition has been optimized to have excellent melt processability and hot-tack for ease of application to the base fabric of a cushion's underside. In addition, this composition combines the aforementioned features with outstanding flexibility and cold-tack for enabling good, stable reattachments to surfaces, particularly non-planar surfaces and especially the curve metal surfaces of a motorcycle fender.

One representative adhesive layer consists of about 8-20 wt. % Septon-brand thermoplastic elastomer (or TPE) polymer; about 40-60 wt. % mineral oils and about 20-35 wt. % C-5 hydrocarbon resin. It is to be understood, however, that still other formulaic adhesive compositions may accomplish the goals and objectives for repeated adhesion of a cushion to a surface according to the present invention.

In whichever versions/sizes desired, the aforementioned adhesive gel should not extend to the edges of the cushion's full underside. Nor does it wrap over and up one or more sidewalls. To better protect that adhesive gel layer when NOT in use, the invention is provided with a pull away outer skin (not shown). Should this gel layer pick up residual items from the motorcycle fender and/or sports seat, it can be easily washed after removal and before its protective cover is returned there over for safe storage.

This polymer adhesive material is designed to be removable and replaceable with modifiable properties that allow for repeated attachment, detachment and reattachment. The gel should be applied to the underside of a seat cushion with a thickness that allows for conformability, yet minimizes stress between material and other objects.

In still other embodiments, the housing to the cushion proper can be fitted with a small sleeve or pocket into which the gel's outer skin may be stored for eventual reuse over and over again. Such a protective sleeve/pocket is not shown in any of the accompanying drawings, however.

For greater use in multiple "temperature" ranges, the cushion can be fitted with a heater element, cooling insert/pad, or both. Alternately, for some applications, it may be desired to add a vibrating/massage element to the cushion.

The present invention is a superior pillion pad compared to anything on the market today in terms of comfort, style and ease of use. Its innovative and reusable Pressure Sensitive Adhesive (PSA) allows the rider to provide a safe and comfortable riding experience for a passenger without the worry of leaving scratches, rings or dents in the fender paint that strap-on or suction pillion pads leave behind. Its combination gel and memory foam insert is the most comfortable, detachable passenger seat available. Ideally, it can be made and sold in three available sizes: medium, small or "Sneak". The latter does not have an intermediate insert layer. As such, it can be carried in one pocket or slipped under your driver's seat for the unexpected passenger.

This invention takes removable passenger seating to the next level! It lets cycle enthusiasts offer their passengers a comfortable ride without having to install a permanent second seat or other temporary seat that may damage the expensive custom paint jobs on many bike fenders. And the combination of reusable Pressure Sensitive Adhesive (PSA) and gel/memory foam inserts do just that!

The PSA lets this invention easily, yet temporarily install on one's bike fender. It also enables easy uninstalling thereafter. Simply remove the protective plastic sheet, place the pad flat on the fender and press down firmly. The pad will remain in place for the duration of the ride with no slipping because of this PSA. When the ride is over, slowly pull up from one of the corners to release the PSA base layer. Make sure to replace the protective plastic sheet for storage until the next time the pad is needed. The best part is that no residue, scratches, suction marks or dents will be left behind!

Routine maintenance of this invention is quite easy. If the pressure sensitive adhesive were to get dirty for whatever reason, simply use a damp rag and most any window cleaning solution to clean. It is preferred that the pad/cushion be stored, when not in use, with the protective plastic sheet provided. It is further preferred that a water resistant neoprene seat cover surround the upper, outer cushion exterior so as to protect the insert from water saturation. If the pad were to get wet, it can be simply dabbed dry with a towel or rag before letting its user/passenger take it for another good, comfortable ride. On an alternative basis, one variation of cushion includes a top cover (if not the whole housing) made from wool material for better ventilation in and through the pad proper.

It is to be understood that the present invention is not limited to the sole embodiment described above, but encompasses any and all embodiments within the scope of the following claims.

I claim:

1. A flexible cushion for removably attaching to a surface and resting a human seat thereon, said cushion comprising: a housing having a top and bottom surface, a flexible gel layer in said housing and a flexible layer of adhesive permanently applied to the bottom surface of said housing for removably attaching said flexible cushion to the surface without marking or leaving a residue on that surface after said flexible cushion is removed therefrom for subsequent reuse, said flexible adhesive layer contacting directly with the surface on which the human seat will be resting.

2. The flexible cushion of claim 1 wherein said housing further comprises at last one foam layer.

3. The flexible cushion of claim 1 wherein said surface is non-planar and the bottom surface of said cushion is meant to conform in shape to said non-planar surface.

4. The flexible cushion of claim 1, which is a seat cushion for use on a vehicle selected from the group consisting of: a motorcycle, a wheelchair, industrial equipment, a tractor, a riding mower and a snowmobile.

5. The flexible cushion of claim 4, which is used for positioning on a curved motorcycle fender for a passenger to use.

6. The flexible cushion of claim 1, which is a seat cushion for use on an existing seating area selected from the group consisting of: an office chair, a main rider seat of a motorcycle, a lawn chair, a folding chair, a bar stool and a picnic bench.

7. The flexible cushion of claim 1, which is a seat cushion for use at a sporting event for temporarily adhering to at least one of: an outdoor stadium seat, a bleacher and a sports vehicle.

8. The flexible cushion of claim 7, which further includes a shoulder strap connector or handle for transporting to the sporting event.

9. The flexible cushion of claim 1 wherein the flexible layer of adhesive comprises: a thermoplastic elastomer component, a mineral oil component and a hydrocarbon resin component.

10. The flexible cushion of claim 9 wherein the flexible layer of adhesive comprises: about 8-20 wt. % of the thermoplastic elastomer component, about 40-60 wt. % of the mineral oil component and about 20-35 wt. % of the hydrocarbon resin component.

11. The flexible cushion of claim 1, which further comprises a protector layer for covering the flexible layer of adhesive when the cushion is not in use.

12. The flexible cushion of claim 11, which further comprises a storage pocket for the protector layer when the cushion is in use.

13. A curvable, flexible seat cushion for removably attaching to a non-planar surface, said flexible seat cushion comprising: a housing having a top and bottom surface, a flexible gel layer in said housing and a flexible layer of adhesive permanently applied to the bottom surface of said housing for removably attaching said flexible cushion to said non-planar surface without marking or leaving a residue on that non-planar surface after said flexible cushion is removed therefrom for subsequent reuse, said flexible adhesive layer contacting directly with the non-planar surface.

14. The flexible seat cushion of claim 13 wherein said housing further comprises at last one foam layer.

15. The flexible seat cushion of claim 13, which is adapted for use on a vehicle selected from the group consisting of: a motorcycle, a wheelchair, industrial equipment, a tractor, a riding mower and a snowmobile.

16. The flexible seat cushion of claim 15, which is positioned on a curved motorcycle fender for passenger use.

17. The flexible seat cushion of claim 13 wherein the flexible layer of adhesive comprises: about 8-20 wt. % of the thermoplastic elastomer component, about 40-60 wt. % of the mineral oil component and about 20-35 wt. % of the hydrocarbon resin component.

18. A flexible seat cushion for removably attaching to a curved motorcycle seat or fender, said flexible cushion comprising: a housing having a top and bottom surface, a flexible gel layer in said housing and a flexible layer of adhesive permanently applied to the bottom surface of said housing for removably attaching said flexible cushion to said motorcycle seat or fender without marking or leaving a residue on that motorcycle seat or fender after said flexible cushion is removed therefrom for subsequent reuse, said flexible adhesive layer contacting directly with the motorcycle seat or fender.

19. The motorcycle seat cushion of claim 18 wherein the flexible layer of adhesive comprises: about 8-20 wt. % of the thermoplastic elastomer component, about 40-60 wt. % of the mineral oil component and about 20-35 wt. % of the hydrocarbon resin component.

\* \* \* \* \*